United States Patent
Randall

(10) Patent No.: US 12,468,754 B2
(45) Date of Patent: Nov. 11, 2025

(54) METHOD AND APPARATUS FOR THE COLLECTION AND MANAGEMENT OF QUANTITATIVE DATA ON UNUSUAL AERIAL PHENOMENA VIA A CITIZEN NETWORK OF PERSONAL DEVICES

(71) Applicant: Mitch Randall, Boulder, CO (US)

(72) Inventor: Mitch Randall, Boulder, CO (US)

( * ) Notice: Subject to any disclaimer, the term of this patent is extended or adjusted under 35 U.S.C. 154(b) by 0 days.

(21) Appl. No.: 18/128,181

(22) Filed: Mar. 29, 2023

(65) Prior Publication Data
US 2024/0004918 A1    Jan. 4, 2024

Related U.S. Application Data

(60) Provisional application No. 63/326,014, filed on Mar. 31, 2022.

(51) Int. Cl.
*G06F 16/45* (2019.01)
*G06F 16/48* (2019.01)
*G06F 16/487* (2019.01)

(52) U.S. Cl.
CPC ............ *G06F 16/45* (2019.01); *G06F 16/487* (2019.01); *G06F 16/489* (2019.01)

(58) Field of Classification Search
CPC ...... G06F 16/45; G06F 16/487; G06F 16/489; G06F 16/909
USPC ......... 707/722, 736, 827; 709/203, 224, 229
See application file for complete search history.

(56) References Cited

U.S. PATENT DOCUMENTS

| | | | |
|---|---|---|---|
| 6,618,648 B1 * | 9/2003 | Shirota | H02H 7/263 700/286 |
| 2010/0010664 A1 * | 1/2010 | Kadaba | G05B 19/0428 348/E7.086 |
| 2017/0256109 A1 * | 9/2017 | Bhattacharya | G06Q 10/0631 |
| 2018/0103414 A1 * | 4/2018 | Golsch | B60R 25/2018 |
| 2019/0066518 A1 * | 2/2019 | Chenchu | G08G 5/53 |
| 2020/0099531 A1 * | 3/2020 | Chidambaram | G06Q 50/18 |
| 2020/0368616 A1 * | 11/2020 | Delamont | H04N 13/239 |

(Continued)

*Primary Examiner* — Phong H Nguyen
(74) *Attorney, Agent, or Firm* — James R. Young; Cochran Freund & Young LLC

(57) ABSTRACT

The present invention relates to a method and apparatus to quantify unusual aerial phenomena via a network of citizen operated personal devices. A feature of the present invention is an app that runs on popular personal devices. A further feature of the invention is a server system in communication with said app. A further feature of the invention is a means by which a user having spotted a potential event can quickly engage the app to begin a data collection mode. A further feature of the invention is a data collection mode that simultaneously records data including but not limited to video, audio, 9-axis IMU data, GPS coordinates, and time. A further feature of the invention is a method of tagging the collected data with a cryptographic signature 800 to ensure integrity. A further feature of the invention is real-time app communication to a centralized server. A further feature of the invention is an alert to other users indicating something of interest is happening nearby. A further feature of the invention is the a means by which the server can distinguish interesting events from non-interesting events. A further feature of the inventions is a means by which the server can analyze the data to obtain scientifically useful quantitative information.

9 Claims, 6 Drawing Sheets

(56) References Cited

U.S. PATENT DOCUMENTS

2021/0279316 A1\* 9/2021 Eisen .................. G06F 21/32
2021/0302621 A1\* 9/2021 Brown ................. H04Q 9/00
2021/0400439 A1\* 12/2021 Troester ............... H04W 4/029

\* cited by examiner

METHOD AND APPARATUS FOR THE COLLECTION AND MANAGEMENT OF QUANTITATIVE DATA ON UNUSUAL AERIAL PHENOMENA VIA A CITIZEN NETWORK OF PERSONAL DEVICES

CROSS-REFERENCES TO RELATED APPLICATIONS

The present application is a utility patent. This application claims the benefit of U.S. Provisional Application Ser. No. 63/326,014, filed on Mar. 31, 2022 which is incorporated herein by reference.

BACKGROUND OF THE INVENTION

Field of the Invention

The present invention relates to a method and apparatus for the collection and management of quantitative data on unusual aerial phenomena via a citizen network of personal devices.

Description of the Related Art

Attempts have been made in the past to attain sighting information from citizens regarding unusual aerial phenomena. These include organizations that provide contact numbers whereby citizens can report their observations. Some organizations provide on-line forms to attempt to gather relevant information, as well as to help process the volume of incoming sighting reports. In some cases, personal device apps have been provided to assist in collecting citizen sighting information. Because of the nature and use of the sighting information, these data are considered anecdotal and not of scientific value. Some of these data may be part of deliberate hoaxes.

What is needed is a method and apparatus whereby a network formed of citizens using personal devices can operate to collect data on unusual aerial phenomena that is of the quality and integrity sufficient to be considered scientifically quantitative and useful.

The present invention relates to a method and apparatus to quantify unusual aerial phenomena via a network of citizen operated personal devices.

A feature of the present invention is an app that runs on popular personal devices, e.g., mobile cellular telephones (cell phones). A further feature of the invention is a server system in communication with said app. A further feature of the invention is a means by which a user having spotted a potential event can quickly engage the app to begin a data collection mode. A further feature of the invention is a data collection mode that simultaneously records data including but not limited to video, audio, 9-axis inertial measurement unit (hereinafter "IMU") data, global positioning system (hereinafter "GPS") coordinates (position information), and time. A further feature of the invention is a method of tagging the collected data with a cryptographic signature to ensure integrity. A further feature of the invention is real-time app communication to a centralized server. A further feature of the invention is an alert to other users indicating something of interest is happening nearby. A further feature of the invention is a means by which the server can distinguish interesting events from non-interesting events. A further feature of the inventions is a means by which the server can analyze the data to obtain scientifically useful quantitative information.

These and other features, aspects and advantages of the present invention will become better understood with reference to the following drawings, description and claims.

DETAILED DESCRIPTION OF THE INVENTION

Figure 1:
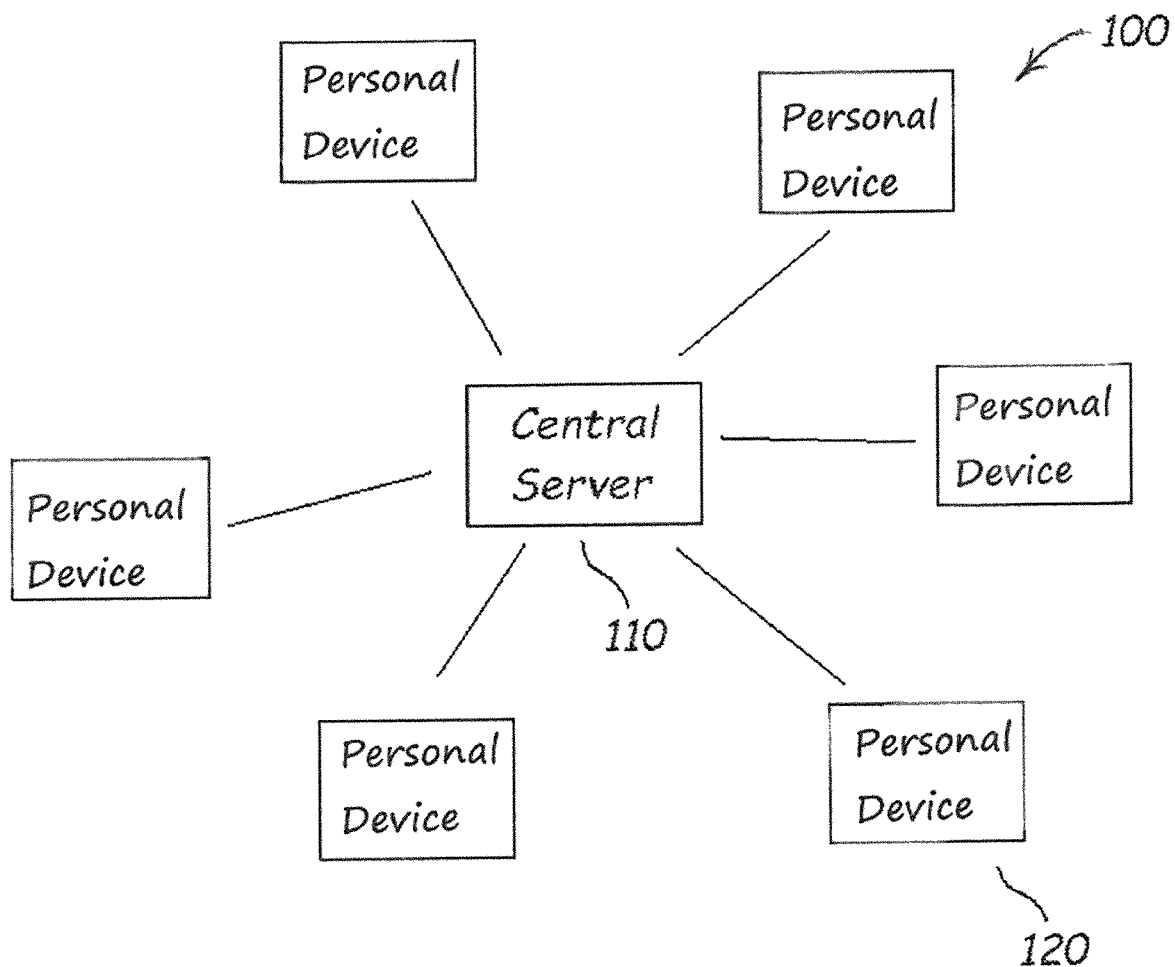
FIG. 1 is a block diagram of the system configuration with a central server in communication with a network of personal devices.

The present invention provides a method and apparatus for collecting and managing scientifically usable quantitative data on unusual aerial phenomena using a centralized server 110 and a network of citizens (users) in possession of personal devices 120 as illustrated diagrammatically in FIG. 1. Each of the personal devices 120 contains sensors 280 comprising a precision clock 210, a GPS receiver 220, a video camera 230, a microphone 250, and a 9-axis IMU sensor 240 as illustrated in the block diagram in FIG. 2. Sensors 280 of personal device 120 are in communication with host processor 260. Host processor 260 is in communication with internet connection 270 and local memory 290. In the example personal device 120, host processor 260 can access information from sensors 280, and/or control sensors 280. Further host processor 260 can transmit information through internet connect 270 to the central server 110 in FIG. 1 and store information in non-volatile media storage 290 in the personal device 120.

Figure 2:
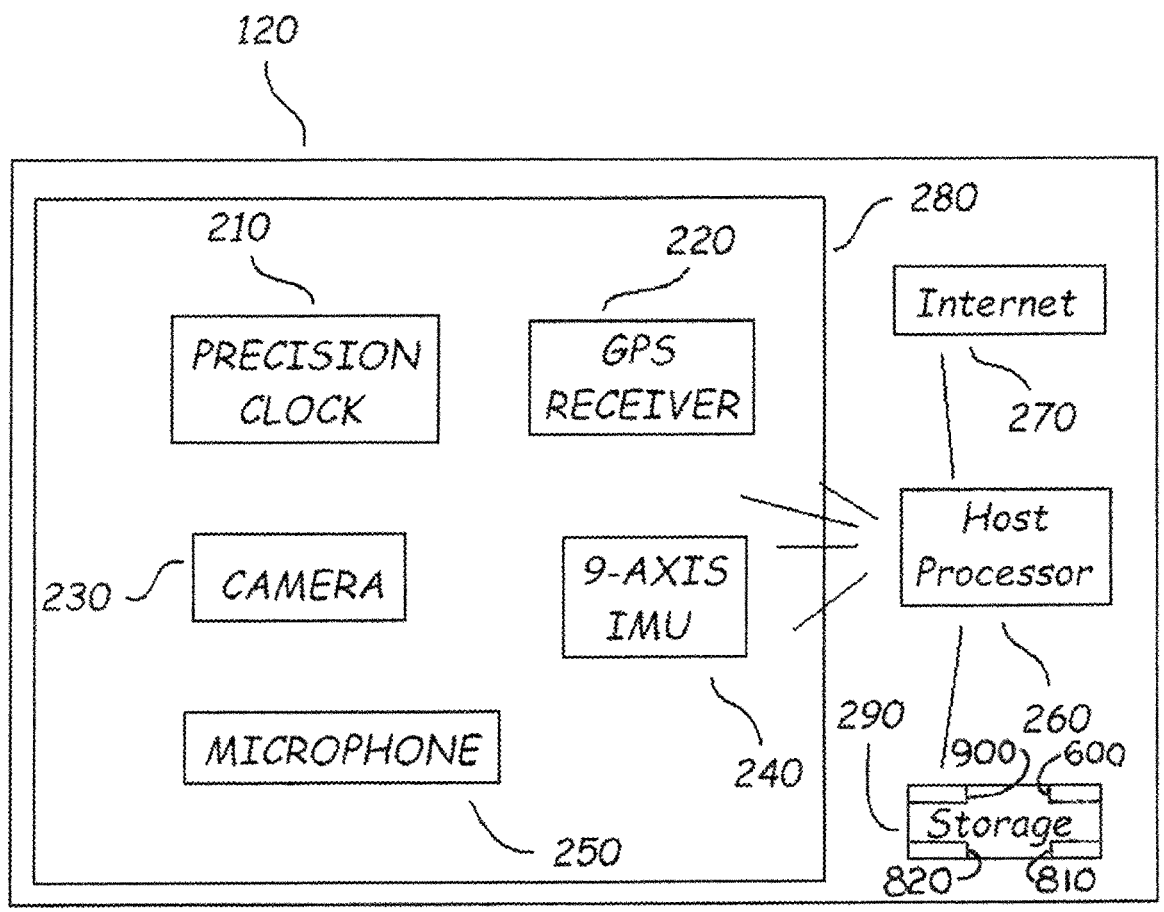
FIG. 2 is a block diagram of a typical personal device comprising sensors such as a GPS receiver, IMU sensor, precision clock, microphone, and camera, and controlled by a host processor in communication with local memory and an internet connection.
Figure 3:
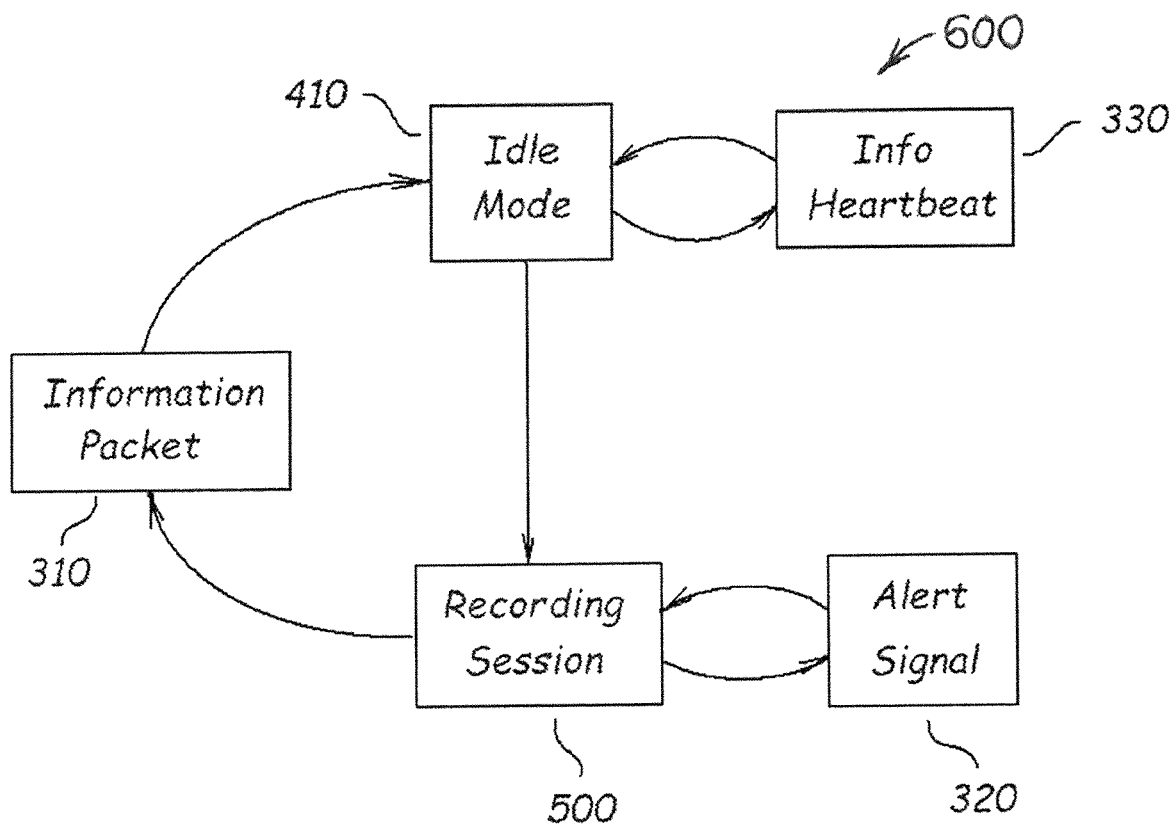
FIG. 3 is a state diagram showing typical modes comprising an idle mode and a recording mode, as well as transmission events info heartbeat, alert signal, and information packet.

In the preferred embodiment, users download app 600 (FIG. 3) of the present invention into the local memories 290 on their personal devices 120. App 600 gains permission to access the sensors 280 (FIG. 2). App 600 normally remains in idle mode 410 (FIG. 3) except to keep track of bias offsets and pointing direction i.e., vector 740 angle (FIG. 6) of 9-axis IMU 240 (FIG. 2), and/or any other necessary housekeeping analytics or control as would be called for to enable the method of this invention. In the preferred embodiment, in idle mode 410, app 600 periodically sends the GPS position of the personal device 120 in an info heartbeat 330 (FIG. 3) to the central server 110 (FIG. 1) for purposes as described below. The other personal devices 120 in the network (FIG. 1) also transmit such info heartbeats 330 to the central server 110. If a user of a personal device 120 observes an event of interest (e.g., an aerial phenomenon or object), the user can point the camera 230 of the personal device 120 toward the event of interest and invoke a recording session 500 of the app 600 on that personal device 120. In this recording mode 500 with the camera 230 of the personal device 120 pointed at the event of interest, the host processor 260 (FIG. 2) of that personal device 120 records data from its sensors 280 to its local memory 290. In addition, host processor 260 under the direction of app 600 sends relatively slow, periodic, repeating alert signals 320 (FIG. 4) to the central server 110 through internet connection 270.

Figure 4:
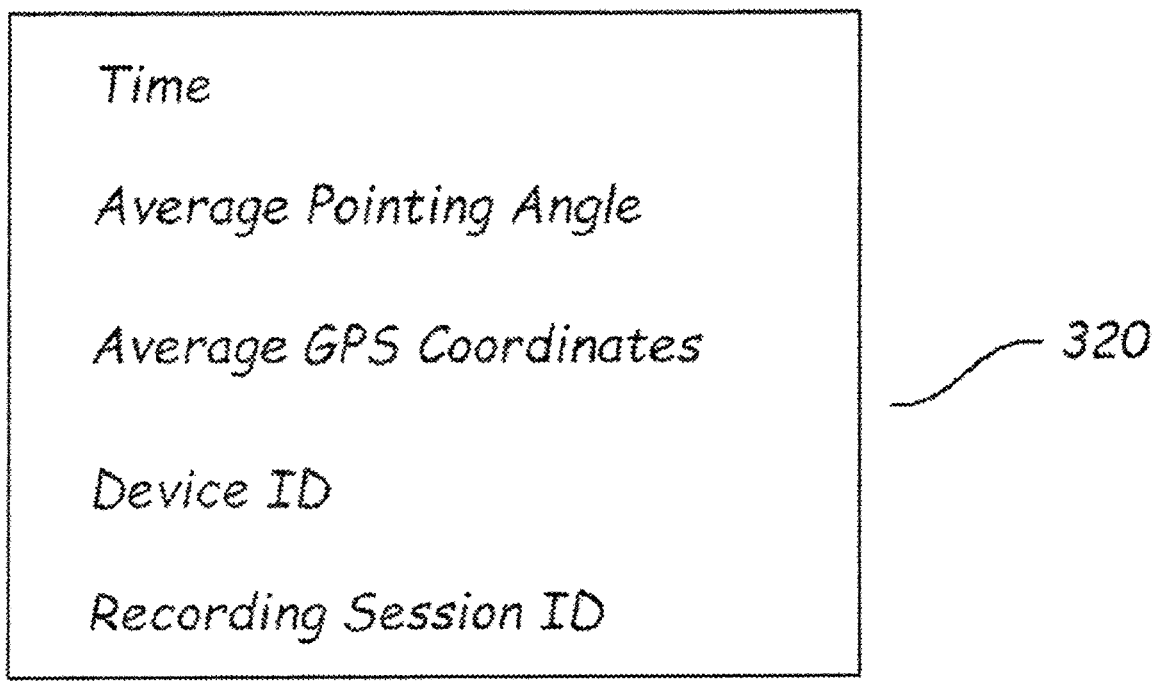
FIG. 4 is a representation of the contents of the alert signal packet comprised of a time stamp, an average camera pointing angle, an average GPS position, a device ID, and a recording session ID.
Figure 5:
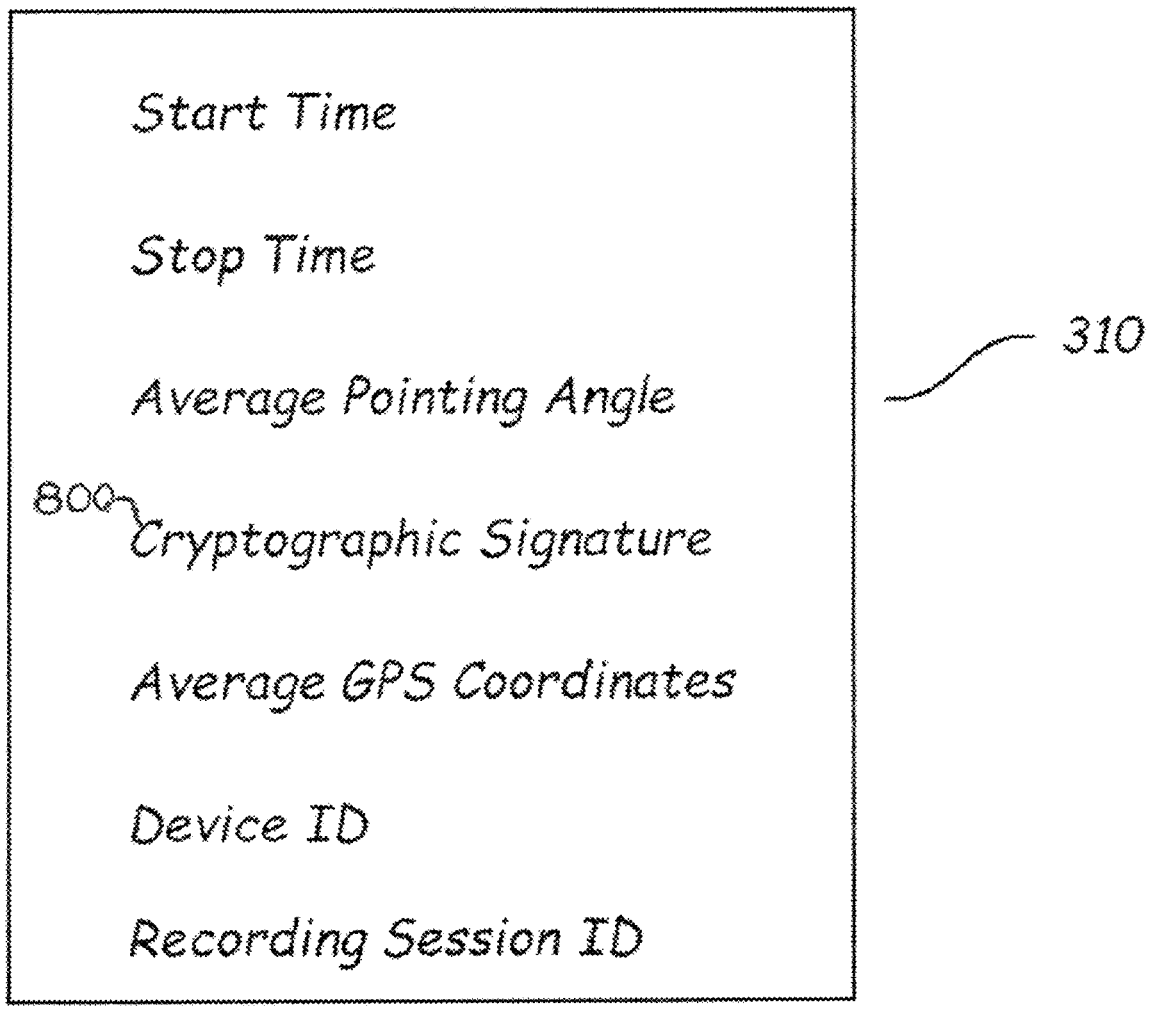
FIG. 5 is a representation of the contents of the information packet comprised of a start time, a stop time, an average camera pointing angle, a cryptographic signature, average GPS coordinates, a device ID, and a recording session ID.
Figure 6:
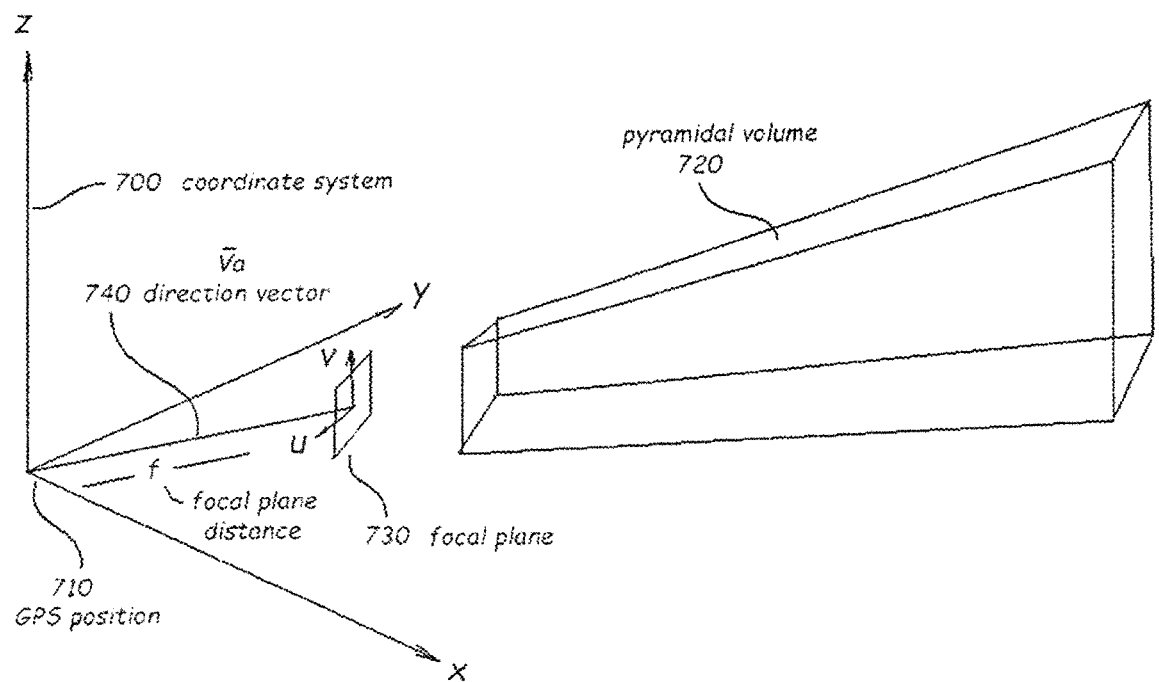
FIG. 6 is a 3-dimensional isometric projection of the Cartesian coordinate system with an equivalent image plane at distance f, and screen coordinated unit vectors.

Alert signal 320 as illustrated in FIG. 4 comprises a set of informative metrics regarding recording session 500. These informative metrics include but are not limited to the current time, average pointing angle, average GPS coordinates, and device ID. The central server 110 receives this information transmitted from personal device 120 under the direction of app 600. The location information, i.e., GPS coordinates, in the alert signals 320 is used in the central server 110 to check if other users in the network are nearby based on the idle mode 410 periodic heartbeat 330 transmissions of position data of the other personal devices 120 in the network to the central server 110. In response to alert signal 320 from a personal device 120, and with general knowledge of the GPS positions (locations) of all personal devices 120 in the network from their heartbeat transmissions 330 as explained above, the central server 110 transmits a notice signal to the other personal devices 120, nearby to the position indicated in said alert signal 320, indicating that a possible unusual aerial phenomenon (event of interest) may have been spotted. The pointing angle and GPS location of personal device 120 as indicated in alert signal 320 sent to central server 110 as directed by the app 600 is interpreted by algorithms in server 110 to determine the pyramidal volume 720 (FIG. 6) that is used to inform other users where they might find said event of interest (aerial phenomenon or object) in the sky as explained below. The focus of recording session 500 (FIG. 3), i.e., the pyramidal volume 720 (FIG. 6) is determined by, thus known to, server 110 from the data in the alert signal 320 (FIG. 4) by virtue of known GPS position and pointing angle of personal device 120 that was transmitted in the alert signals 230 to the central server 110 as provided by the GPS receiver 220 and 9-axis IMU 240 sensors in that personal device 120 as explained above. These GPS position and pointing angle data are recorded and utilized in relation to a Cartesian coordinate system 700, as illustrated in FIG. 6, wherein the origin 710 corresponds to the GPS location of that personal device 120 and the pointing angle of that personal device 120 corresponds to direction vector 740 extending from origin 710 in the direction of the direction vector 740 to the center of the focal (image) plane 730 as defined by the direction vector 740 $\bar{v}_a(s_x, s_y)$ evaluated at the four corners of the image at the focal plane 730 as shown in FIG. 6 and equation (1) below. These parameters imply a pyramidal volume 720 extending to infinity within which the event of interest (unusual aerial phenomenon or object) is expected to be contained, assuming that the personal device 120 was pointed at the event of interest when the alert signals 320 were initiated and sent to the central server 110.

In the preferred embodiment, if other users of personal devices 120 equipped with the sensors 280 and app 600 are in the vicinity and either of their own volition or in response to the notification from the central server, point their personal devices 120 at the event of interest and initiate a recording session 500, thus transmissions of alert signals 320 from their own personal devices 120 to the central server 110, the additional pointing angles obtained by the central server 110 from those additional alert signals 320 are used by algorithms in server 110 along with any additional location and pointing angles received from the personal device 120 that are transmitting periodic alert signals 320 to further refine the location of the event of interest to better inform additional other users of such personal devices 120 operating app 600 where to look for the event of interest. This occurs by virtue of the volume defined by the intersections of the pyramidal volumes 720 of the plurality of personal devices 120 involved in pointing at and recording the same event of interest.

When a user stops the recording session 500 on a personal device 120, the app 600 on that personal device 120 creates an information packet 310 from data stored in the memory 290 during the recording session 500 and transmits the information packet 310 to the central server 110. Information packet 310 comprises information that summarizes the data recorded by the user during recording session 500 comprising a start time, stop time, average pointing angle, average GPS coordinates, device ID, recording session 500 ID, and a cryptographic signature 800. The cryptographic signature 800 at minimum contains a hash of all the data that was recorded from sensors 280. In the preferred embodiment, cryptographic signature 800 relates to the hash of a recording data file 810 on storage memory 290 comprising all the raw data recorded during recording session 500, including all information required as per the method of this invention. Thus if any of the information of recording session 500 as stored in recording data file 810 on storage memory 290 were to be altered, the cryptographic signature 800 hash would not match.

In the preferred embodiment, the cryptographic signature 800 is a hash of all the data recorded and stored in storage 290 as a single recording data file 810 during recording session 500. In an alternative embodiment, the cryptographic signature 800 can be a crypto currency transaction, or NFT (non-fungible token).

In the preferred embodiment, a record of information packet 310 is kept in storage memory 290, which serves as a means for users to confirm the findings of the central server 110 host. In one embodiment, an email containing the cryptographic signature and other contents of information packet 310 is sent to an email account of the user associated with the personal device 120 responsible for recording the associated recording session 500, e.g., the personal device that transmitted the periodic alert signals 320 to the central server 110. In this way, the data of recording session 500 stored in recorded data file 810 is protected from attacks from the user side or the server side.

In the preferred embodiment, after recording session 500, the user of personal device 120 responsible for generating recording session 500 of said event of interest is presented with an event form that regards recording session 500. The event form can be filled out partly by said user, but requires a minimum set of information that is necessary for the central server 110 to use to aid in vetting the recording session 500 at the central server 110. The user can access the event form of recording session 500 later from the memory 290 to fill in the remainder of the event form that better describes what the user witnessed, i.e., the event of interest.

In the preferred embodiment, subsequent to a data collection session 500, an object detection neural net 900 on the local app 600 is applied to images captured by the camera 230 and recorded in the memory 290 to highlight detected objects in the image. The user is prompted to assist the app 600 in annotating the object, throughout the video, highlighted by the object detection neural net 900 that the user identifies as the event of interest which was observed by the user and that prompted the user to point the camera 230 of the personal device 120 at such event of interest and to invoke the recording session 500. This process, including the annotation, helps in the case that other objects may also be present in the image but are known to the user to be not of interest.

In the event that a recording session 500 is invoked during a period in which personal device 120 is not in communication with the internet, the integrity of recorded data file 810 benefit from strict two-sided attack protection. However, the method of this invention increases significantly the difficulty of a hoaxing attack involving synthetic data mimicking what is expected of the ensemble of sensors 280.

In the event that multiple recording sessions 500 are captured for a sighting of an event of interest, e.g., an anomalous object, by multiple personal devices 120 in communication with the central server 110, it is assumed that the authenticity of the event of interest is virtually guaranteed, as the creation of real-time synthetic data required to hoax the event would be insurmountably difficult by any standard.

In some cases, the object detection neural net 900 may not be able to find the event of interest in the images of recording session 500. In that case, the user is prompted to add in a bounding box to annotate the location of the object in the images. Once the annotations of the video are acceptable to the user, the metadata describing the annotations are sent to the central server 110.

In an alternative embodiment, in the case of multiple recording sessions 500 having captured the same event of interest from different directions, Neural Radiance Fields (NeRF) or other techniques known to those skilled in the art may be employed to faithfully reconstruct animated views, and/or three-dimensional (hereinafter "3D") models of the event of interest.

User calibration can be performed before, during, or after a sighting by pointing the camera at the sun or moon or constellation.

Server 110 may comprise a collection of servers located together or located apart and acting together in the manner described in the method of this invention.

Server 110 must vet the data coming in from potentially millions of personal devices 120 of the network 100. There are likely to be many sightings of usual objects such as airplanes or stars. There will also be reports associated with errors and tests and jokes and attempted hoaxes. A feature of the present invention is the ability to automatically vet recording sessions 500 to separate usual objects from the unusual objects that are the subject of this invention.

Recall that all data from recording sessions 500 is stored locally in storage 290 of users' personal device 120. Server 110 receives recording session 500 metadata from alert signals 320 and information packets 310. The data of recording session 500 may stay stored in recorded data file 810 only in storage 290 on personal device 120 for a long period of time (days, weeks, months, years) without ever being uploaded to server 110. Only when a recording session 500 is deemed significant is all the data from recording session 500 as stored in recorded data file 810 uploaded from storage 290 of personal device 120 to server 110. In the preferred embodiment, the user is not involved in approving or being aware of the upload of recorded data file 810 of their recording session 500.

In an alternative embodiment, recorded data file 810 may be uploaded to server 110 and/or deleted from personal device 120 storage 290 after a predetermined amount of time in order to better manage storage 290 on personal device 120. In this embodiment it is somewhat more likely that important information could be lost by deletion before a determination of its importance is made.

In the preferred embodiment, information packets 310 for all recording sessions 500 are saved at the server 110 in a database. The amount of data per information packet 310 is fewer that 100 bytes, so that even one billion information packets 310 could easily be stored. Further, they are each time-tagged, so that they can be stored by date and archived. In the preferred embodiment data is kept indefinitely to allow for retrieval at some time in the future. In an alternative embodiment, data may be kept only a maximum time before being deleted in order to better manage storage space on server 110.

At the first level, the required information of event form mentioned above is used to determine if recording session 500 is of significance. The lack of a submitted event form is the first level of disqualification. Event form collects other information from questions to the user responsible for initiating a recording session 500 targeted directly at the nature of the event to further disqualify said recording session 500. An example question may be, "Was this event a mistake?" Or, "Was this a sighting of something of interest?"

In the preferred embodiment, recording sessions 500 are disqualified by the central server 110 unless multiple users record the same event. The average GPS location and average pointing angle metadata available from alert signal 320 and information packet 310 are used by the central server 110 to determine whether multiple users could have recorded the same object. If no such multiple sighting exists for a recording session 500, it is disqualified for further study until and unless further information is revealed in the future that warrants further investigation. At that time, the data of recording session 500 as stored in recorded data file 810 can be uploaded from the users personal device 120 to server 110.

In the preferred embodiment, the raw data of the 9-axis IMU is recorded in real-time during recording session 500 into recorded data file 810 on storage 290. These raw data are in integer counts of the IMU signals, and contain unwanted biases that are normally removed during processing within the personal device 120. In the preferred embodiment, these biases can be removed in a two-pass or Wiener algorithm known to those skilled in the art. In the two-pass algorithm, the IMU data are processed by means well known to those skilled in the art, such as by the method of Magdwick, known to those skilled in the art. When the full data stream has been processed, the final biases can be used to initialize the biases for a second pass. Further, GPS position can be used to place an upper bound on accelerations. These approaches amount to estimation by the technique of Wiener rather than Kalman, and can be used to estimate absolute position and relative orientation of the camera with relatively high accuracy. The techniques by which this is accomplished are known by those skilled in the art.

By this method, a high-quality estimate of camera absolute position and relative pointing angle can be determined. And with this information, the direction vector 740 that describes the direction pointed to by any pixel in the recording can be determined, subject to knowledge of a focal plane distance $f=|\bar{v}_a(0,0)|$, which represents the distance from the origin 710 to the focal plane 730 and is a predetermined parameter of the camera for a given zoom. With the computed rotation matrix R representing the pointing angle of camera 230, we find the vector defined by a given $s_x$, $s_y$ pixel coordinate as $$\bar{v}_a = fR \begin{bmatrix} 0 \\ 1 \\ 0 \end{bmatrix} + s_x \hat{u} + s_y \hat{v} \quad (1)$$

where $$\hat{u} = R \begin{bmatrix} 1 \\ 0 \\ 0 \end{bmatrix} \quad (2)$$

$$\hat{v} = R \begin{bmatrix} 0 \\ 0 \\ 1 \end{bmatrix}$$

And focal plane distance f is the equivalent focal length from the origin 710 to the focal (image) plane 730. In the case of fixed lens, the focal plane parameter f is simply a parameter of the model of personal device 120. In the case of a variable zoom lens, the focal plane parameter f can be determined by the personal device 120 camera model 820, which can be stored in memory 290 (FIG. 2), and with the camera metadata that describes the camera zoom factor. A lookup table of camera model 820 or curve is used to relate the camera 230 zoom factor of the metatdata stored in recorded data file 810 to the focal plane parameter f.

A vector pointing in the direction of an event of interest (e.g., object) is determined based on the ($s_x$, $s_y$) coordinates of said object in camera 230 image and the pointing angle of camera 230 of personal device 120. If two or more recording files 810 from two or more personal devices 120 exist regarding the same event, and if the two or more said personal devices are separated in location sufficiently to form an adequate baseline, triangulation can be used to determine the position of said object.

In general a plurality of vectors describing the pointing angle to an object will violate epipolar constraints due to inaccuracies. For this reason the preferred embodiment computes the location of the object using least-squares triangulation wherein a position is found such that the sum of the pointing errors of all contributing vectors is minimized so as to best estimate the actual location of the object of interest.

The degree to which the epipolar constraint is violated serves as a metric on the accuracy of the camera 230 pointing computation. Thus, error bars can be determined by those skilled in the art as is necessary in the pursuit of scientific quality data as per the intent of the present invention.

With 9-axis IMU 240 computations the relative orientation estimation is highly accurate up to a fixed rotation dependent upon magnetic compass biases, disturbances, and inaccuracies. Thus, if the data from two recording sessions 500 from two users at two different locations are used to triangulate position, we can expect errors. In the preferred embodiment, a more accurate absolute pointing angle can be determined by correlating landmarks in the image with landmarks at the site where the recording session 500 was recorded. This requires a visit to the site, and is reserved only for cases that, if confirmed, would justify the effort. In some cases, this refinement of absolute pointing angle could be performed without visiting the site provided distant landmarks can be seen prominently.

A usual problem with modern personal device 120 cameras 230 is that they are not designed to focus on tiny objects in a uniform background, such as would often be encountered in the hunt for unusual aerial phenomenon (i.e., events of interest). In the preferred embodiment, the focus is set for infinity when the recording session 500 is instantiated. This is because the expectation is that the object being observed is greater than 100 meters away from the camera, so that infinite focus is ideal.

In an alternative embodiment, the app 600 includes specialized algorithms to detect the object within the frame and measure its response to focus commands. In that way focus can be adjusted in order to minimize and/or clarify the object of interest.

In either focus adjustment embodiment of the current invention, buttons displayed prominently on the screen allow the user to exit the recording session 500 default focus mode and either choose a manual focus mode or allow personal device 120 to take control of focus adjustments.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. Cell phone apparatus that functions as a scientific instrument to facilitate a user of the cell phone apparatus to participate along with other users of other cell phones at random geographic locations and random times in a system for capturing, packaging, and quantifying information data of unusual aerial phenomena in a manner that enables measurements of kinematics of such unusual aerial phenomena, including a time series of measurements of instantaneous position in three dimensions from which velocity and acceleration is derivable and which cannot be obtained with a single video with a single cell phone at a single location, wherein the cell phone apparatus includes a precision clock configured to provide real time data, a global positioning system receiver configured to provide location data of the cell phone apparatus, a video camera configured to record visual data in view of the cell phone apparatus, a 9-axis inertial measurement unit sensor configured to detect orientation and heading of the cell phone apparatus, a microphone configured to capture audio data, an internet connection, a host processor, and a local memory storing instructions that are executable by the host processor to enable cell phone apparatus operations including:

an idle mode that: (i) causes the host processor to access raw pointing direction data from the 9-axis inertial measurement unit sensor, including calibration of bias offsets and application of a two-pass or Wiener algorithm for removal of biases from the raw pointing direction data and recordation of the bias offsets; and (ii) causes the host processor to access the global positioning system position data from the global positioning system receiver and to periodically send global positioning system location of the cell phone apparatus to a central server to maintain a continuously updated map of correspondingly enabled and participating cell phone apparatuses to facilitate spontaneous and coordinated multi-perspective observations and video recordations of the unusual aerial phenomenon;

a recording mode that is invokable by the user of the cell phone apparatus when the user of the cell phone apparatus observes an unusual aerial phenomenon, where, upon such invocation by the user, the host processor initiates a recording session in which: (i) the video camera captures and records visual data of a view in a direction in which the user observes the unusual serial phenomenon and points the video camera; (ii) the visual data is time stamped with time data from the precision clock and recorded simultaneously with audio data, global positioning system position data, and 9-axis inertial measurement unit data from, respectively, the global positioning system receiver and the 9-axis inertial measurement unit sensor into a data file in the local memory, wherein the global positioning system position data and calibrated 9-axis inertial measurement unit data provide a higher degree of accuracy for positioning and orientation than conventionally achievable with global positioning system data alone; (iii) the host processor sends periodic, repeating alert signals to the central server, wherein each of which alert signals includes current time, pointing angle of the video camera in a time interval of each alert signal, and global positioning system coordinates of the location of the cell phone apparatus during the time interval of each alert signal;

a packet transmission mode initiated by the host processor upon cessation of the recording mode by the cell phone apparatus user, whereupon the host processor: (i) performs an object detection operation on images captured by the video camera and recorded in the local memory during the recording mode to highlight objects detected in the images; (ii) generates an information packet that includes a cryptographic signature comprising a hash of the data file that was recorded during the recording mode to prevent subsequent alteration of the data in the data file, which includes start time and end time of the recording session, the images with highlighted objects, the pointing angle of the video camera during the recording session, the global positioning system coordinates of the cell phone apparatus during the recording session, an identification of the cell phone apparatus, and an identification of the recording session; and (iii) transmits the information packet via the internet connection to the central server; and a storage mode in which a recording mode record of all video data along with time stamped and recorded audio data, global positioning system position data, and 9-axis inertial measurement unit data collected in the recording mode is kept in storage in the local memory of the cell phone apparatus.

2. The cell phone apparatus of claim 1, wherein the cell phone apparatus operations include an upload mode in which the host processor, in response to an upload request from the central server, uploads the recording mode record from the local memory to the central server via the internet connection.

3. A central server that includes means for receiving transmissions of data from cell phones, means for transmitting data to cell phones, a processor, and a tangible, non-transitory computer-readable medium storing instructions that are executable by the processor to collect, quantify, and qualify data of unusual aerial phenomena sighted by users of cell phones at random geographic locations and random times as being of scientific value, wherein executions of the instructions cause central server operations comprising:

reception and storage of periodic global positioning system position data of numerous cell phones at random locations and random times;

reception and storage of alert signals sent from at least one of the cell phones, each of which alert signals includes a cryptographic signature comprising a hash of an image obtained by the video camera of the cell phone in a recording session pointed at an unusual aerial phenomenon, time at which the image was obtained, the pointing angle of a video camera of the cell phone from which the alert signal is sent in a time interval of each alert signal, and global positioning system coordinates of the location of the cell phone that sent the alert signal during the time interval of each alert signal;

in response to the reception of the alert signal, send a notification to the other cell phones that a possible unusual aerial phenomenon may have been spotted, including information regarding location of that possible unusual aerial phenomenon in the sky based on a pyramidal volume within which the possible unusual aerial phenomenon is expected to be contained extending from the global positioning system coordinates and pointing angle of the cell phone from which the alert signal was received to infinity;

continued reception of alert signals sent from any of the other cell phones;

storage of all the alert signals received from the cell phones in a database;

refinement of the location of the possible unusual aerial phenomenon by intersection of the respective pyramidal volumes extending from the respective global positioning system coordinates and respective pointing angles of each of the cell phones from which the alert signals is received by the central server, and continued sending of the refined location information to the other cell phones to enhance the ability of the users of the other cell phones to video and sent images along with times at which the images are obtained, the pointing angles of the video cameras of the cell phones from which the alert signals are sent in the time intervals of each alert signal, and global positioning system coordinates of the locations of the cell phones that send the alert signals during the time intervals of each alert signal;

qualification of the recording session as worthy of scientific study of unusual aerial phenomenon based on video data of the same unusual aerial phenomenon being in the alert signals received from more than one cell phone;

generation of an upload request to all the cell phones from which alert signals were received with data of the same unusual aerial phenomenon for upload of a recording record that contains all the video data, time data, pointing angle data, and g data of the cell phone in the recording session in which the same unusual aerial phenomenon was obtained;

reception and storage of the requested recording records in the central server for subsequent processing and display.

4. The central server of claim 3, wherein executions of the instructions cause central server operations that include creation of an animated view of the unusual aerial phenomenon with data in the respective multiple recording records received from cell phones located in multiple different directions from the unusual aerial phenomenon.

5. The central server of claim 3, wherein executions of the instructions cause central server operations that include creation of a three-dimensional model of the unusual aerial phenomenon with data in the respective multiple recording records received from cell phones located in multiple different directions from the unusual aerial phenomenon.

6. A system for collecting data on unusual aerial phenomena of sufficient quality and integrity to be scientifically quantitative and useful, comprising:

A. a plurality of cell phones scattered in random geographic locations at random times, each of the cell phones being equipped with a precision clock configured to provide time data, a global positioning system receiver configured to provide location data of the cell phone, a video camera configured to record visual data in view of the cell phone, a 9-axis inertial measurement unit sensor configured to detect orientation and heading of the cell phone, a microphone configured to capture audio data, a host processor, a local memory, and an internet connection, the functionality of each of the cell phones being improved with a software application that configures and enables cell phone operations that include:

an idle mode that: (i) causes the host processor to access pointing direction data from the 9-axis inertial measurement unit sensor, which includes application of a two-part algorithm for removal of biases and recordation of bias offsets; and (ii) causes the host processor to access global positioning system position data from the global positioning system receiver and to periodically send global positioning system location of the cell phone to a central server; and a recording mode that that is invokable by the user of the cell phone when the user of the cell phone observes an unusual aerial phenomenon, where, upon such invocation by the user, the host processor initiates a recording session in which: (i) the video camera captures and records visual data of a view in a direction in which the user observes the unusual aerial phenomenon and points the video camera; (ii) the visual data is time stamped with time data from the precision clock and recorded simultaneously with audio data, global positioning system position data, and 9-axis inertial measurement unit data from, respectively, the microphone, the global positioning system receiver, and the 9-axis inertial measurement unit sensor into a data file in the local memory; (iii) the host processor sends periodic, repeating alert signals to the central server, wherein each of which alert signals includes current time, pointing angle of the video camera in a time interval of each alert signal, and global positioning system coordinates of the location of the cell phone during the time interval of each alert signal;

a packet transmission mode initiated by the host processor upon cessation of the recording mode by the cell phone user, whereupon the host processor: (i) performs an object detection operation on images captured by the video camera and recorded in the local memory during the recording mode to highlight objects detected in the images; (ii) generates an information packet that includes a cryptographic signature comprising a hash of the data file that was recorded during the recording mode to prevent subsequent alteration of the data in the data file, which includes start time and end time of the recording session, the images with highlighted objects, the pointing angle of the video camera during the recording session, the global positioning system coordinates of the cell phone during the recording session, an identification of the cell phone, and an identification of the recording session; and (iii) transmits the information packet via the internet connection to the central server; and a storage mode in which a recording mode record of all video data along with time stamped and recorded audio data, global positioning system position data, and 9-axis inertial measurement unit data collected in the recording mode is kept in storage in the local memory of the cell phone; and B. a central server that includes means for receiving transmissions of data from the cell phones, means for transmitting data to the cell phones, wherein the central server performs operations comprising:

reception and storage of periodic global positioning system position data of numerous cell phones at random locations and random times;

reception and storage of alert signals sent from at least one of the cell phones, each of which alert signals includes a cryptographic signature comprising a hash of an image obtained by the video camera of the cell phone in a recording session pointed at an unusual aerial phenomenon, time at which the image was obtained, the pointing angle of a video camera of the cell phone from which the alert signal is sent in a time interval of each alert signal, and global positioning system coordinates of the location of the cell phone that sent the alert signal during the time interval of each alert signal;

in response to the reception of the alert signal, send a notification to the other cell phones that a possible unusual aerial phenomenon may have been spotted, including information regarding location of that possible unusual aerial phenomenon in the sky based on a pyramidal volume within which the possible unusual aerial phenomenon is expected to be contained extending from the global positioning system coordinates and pointing angle of the cell phone from which the alert signal was received to infinity;

continued reception of alert signals sent from any of the other cell phones;

storage of all the alert signals received from the cell phones in a database;

refinement of the location of the possible unusual aerial phenomenon by intersection of the respective pyramidal volumes extending from the respective global positioning system coordinates and respective pointing angles of each of the cell phones from which the alert signals is received by the central server, and continued sending of the refined location information to the other cell phones to enhance the ability of the users of the other cell phones to video and sent images along with times at which the images are obtained, the pointing angles of the video cameras of the cell phones from which the alert signals are sent in the time intervals of each alert signal, and global positioning system coordinates of the locations of the cell phones that send the alert signals during the time intervals of each alert signal; and qualification of the recording session as worthy of scientific study of unusual aerial phenomenon based on video data of the same unusual aerial phenomenon being in the alert signals received from more than one cell phone.

7. The system of claim 6, wherein;

A. the operations of the central server also include generation of an upload request to all the cell phones from which alert signals were received with data of the same unusual aerial phenomenon for upload of a recording record that contains all the video data, time data, pointing angle data, and global positioning system data of the cell phone in the recording session in which the same unusual aerial phenomenon was obtained;

B. The operations enabled by the software application that configures and enables the cell phone operations also includes an upload mode in which the host processor, in response to an upload request from the central server, uploads the recording mode record from the local memory to the central server via the internet connection; and C. the operations of the central server also include reception and storage of the requested recording records in the central server for subsequent processing and display.

8. The system of claim 6, wherein the operations of the central server also include provision of quantitative analysis of the aerial phenomenon, including triangulating the position of the unusual aerial phenomenon using least-squares optimization on the data from a plurality cell phones at divers locations, wherein the least-squares optimization minimizes the sum of pointing errors from all contributing vectors to determine the most probable three-dimensional position of the phenomenon even when epipolar constraints are violated due to measurement inaccuracies.

9. A central server comprising specific hardware components configured to execute stored instructions to collect, quantify, and qualify data of unusual aerial phenomena sighted by users of cell phones at random geographic locations and random times as being of scientific value, the central server comprising:

a processor;

a transceiver for receiving transmissions of data from and transmitting data to cell phones;

a tangible, non-transitory computer-readable medium storing instructions that, when executed by the processor, transform the central server into a specialized computing device that performs operations comprising:

receiving and storing periodic global positioning system position data of numerous cell phones at random locations and random times to maintain a dynamically updated real-time map of available observation points;

receiving and storing alert signals sent from at least one of the cell phones, each alert signal including a cryptographic signature comprising a hash of an image obtained by the video camera of the cell phone in a recording session, time at which the image was obtained, the pointing angle of a video camera of the cell phone from which the alert signal is sent, and global positioning system coordinates of the location of the cell phone that sent the alert signal;

in response to the reception of the alert signal, calculating a pyramidal volume within which the unusual aerial phenomenon is expected to be contained, the pyramidal volume extending from the global positioning system coordinates and pointing angle of the cell phone from which the alert signal was received;

sending a notification to other cell phones that a possible unusual aerial phenomenon may have been spotted, including information regarding location of that possible unusual aerial phenomenon in the sky based on the calculated pyramidal volume;

receiving additional alert signals sent from other cell phones;

storing all the alert signals received from the cell phones in a database;

refining the location of the possible unusual aerial phenomenon by calculating an intersection of the respective pyramidal volumes extending from the respective global positioning system coordinates and respective pointing angles of each of the cell phones from which the alert signals are received by the central server, wherein the intersection calculation provides a more precise location determination than possible from any single observation point;

transmitting the refined location information to the other cell phones to enhance their ability to locate and record the phenomenon;

qualifying the recording session as worthy of scientific study based on video data of the same unusual aerial phenomenon being in the alert signals received from more than one cell phone, thereby providing multi-perspective validation;

generating an upload request to all the cell phones from which alert signals were received with data of the same unusual aerial phenomenon for upload of their complete recording records;

receiving and storing the requested recording records for subsequent processing including time-synchronized correlation of multiple observation perspectives; and performing one or more of: creating animated views of the unusual aerial phenomenon from multiple perspectives, generating a three-dimensional tensional model of the unusual aerial phenomenon using Neural Radiance Fields (NeRF) techniques applied to the data in the respective multiple recording records received from cell phones located in multiple different directions, and calculating physical properties of the phenomenon including position, velocity, and acceleration vectors that would be impossible to determine from single-perspective observations.

* * * * *